Patented Nov. 12, 1940

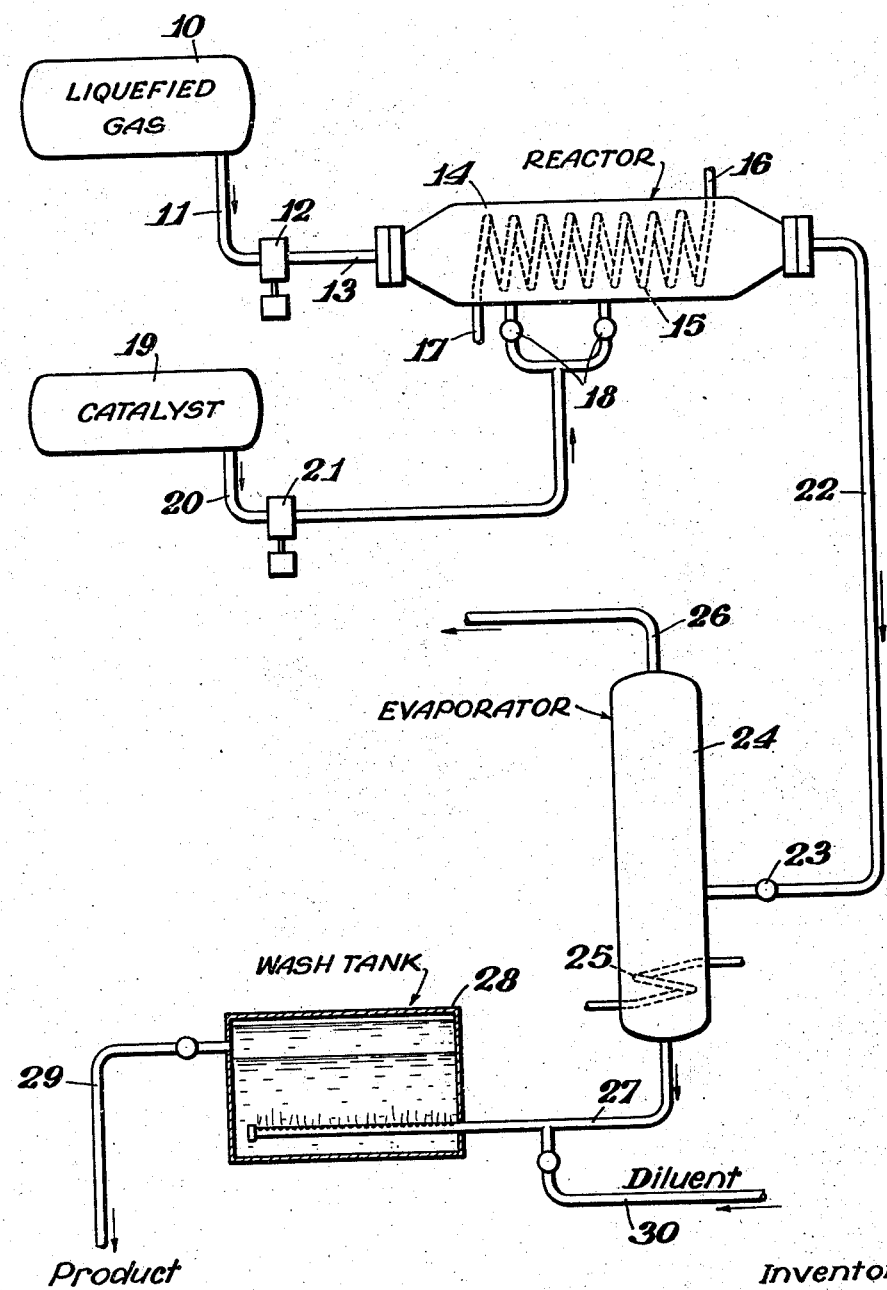

2,221,000

UNITED STATES PATENT OFFICE 2,221,000

POLYMERIZING OLEFIN HYDROCARBONS

Ward E. Kuentzel, Whiting, Ind., and William L. Webb, Chicago, Ill., assignors to Standad Oil Company, Chicago, Ill., a corporation of Indiana Application August 11, 1937, Serial No. 158,454

7 Claims. (Cl. 260—94)

This invention relates to the manufacture of resins by the polymerization of isobutylene and particularly the polymerization of liquid isobutylene in the presence of catalysts. Mixtures of isobutylene, particularly mixtures of isobutylene with normal butylenes and butane may be employed and we prefer to employ the liquefied gaseous by-product of cracking petroleum oils known as light absorption naphtha, containing about 10% to 25% of isobutylene, the remainder being mostly normal butylenes and butanes.

One of the objects of our invention is to convert isobutylene to higher molecular weight hydrocarbon resins by catalytic polymerization under extreme pressure whereby resins of higher molecular weight are produced than heretofore. Another object of our invention is to produce desirable high molecular weight isobutylene resins without the use of costly, extremely low temperature refrigeration heretofore required. Other objects of the invention will be apparent from the following description.

The accompanying drawing which forms a part of this specification describes one means of carrying out the process. Referring to the drawing, 10 is a supply tank for liquefied isobutylene gas, for example, isobutylene diluted with other hydrocarbons such as liquid propane, butane or naphtha, or a supply of light absorption naphtha obtained directly from the fractionation of liquefied cracking still gases.

The liquefied isobutylene is conducted by line 11 to pump 12 by means of which it is subjected to extremely high pressure usually above 5,000 pounds per square inch, and we prefer to employ pressures between 10,000 and 50,000 pounds per square inch. Still higher pressures, for example 100,000 pounds per square inch may be employed. In general, it is essential to use a pressure at least 1000 pounds per square inch above the vapor pressure of the hydrocarbon at the temperature of polymerization, to obtain the desired advantages of our process.

The hydrocarbon stream under the desired high pressure is conducted by line 13 to reaction vessel 14 which is preferably constructed of forged steel of relatively small diameter to withstand the high pressure employed. The reaction vessel 14 is provided with internal cooling coils 15 to absorb the heat of polymerization of the olefin. Cooling water, cold brine, liquid propane, liquid ammonia or other suitable refrigerant may be supplied to coil 15 by connection 16 and discharged by connection 17. Catalyst may be introduced by either or both valved lines 18. It is preferred to employ boron fluoride ($BF_3$) as a catalyst which may be maintained as a liquid in supply tank 19 whence it is withdrawn by line 20 and pump 21, forcing it under high pressure into the reaction vessel 14 at the desired rate. The amount of catalyst required will usually be about 0.5% to 5% by weight of the olefin treated. The boron fluoride may also be dissolved in an inert hydrocarbon solvent such as hexane to facilitate controlling the introduction thereof. The reaction temperature in reaction chamber 14 is controlled within the desired limits and is preferably maintained at about room temperature by the use of cooling water in coils 15., although temperatures as high as 100° C. may be used.

The polymerized reaction product containing excess catalyst is withdrawn by line 22, pressure reducing valve 23 and is discharged into evaporator 24 equipped with heating coil 25. Unpolymerized hydrocarbon gases and excess $BF_3$ catalyst may be recovered therefrom and recycled to the process if desired. The residue in evaporator 24 is withdrawn by line 27 to wash tank 28 where the remaining catalyst is removed and neutralized, the product being discharged by line 29. In order to facilitate handling, a diluent may be introduced by valved line 30, suitable diluents being naphtha, benzene, carbon tetrachloride, light lubricating oil, etc. The diluent may be subsequently removed by distillation or allowed to remain in the product where the use of the product permits.

By employing our high pressure polymerization process, for example operating at a pressure of 20,000 pounds per square inch, it is possible to obtain a considerable increase in the viscosity and molecular weight of the polymerized product. Thus, by operating at ordinary pressures and room temperature, isobutylene may yield a product having an average molecular weight of about 1,000, the molecular weight may be increased to more than twice this value by using high pressures. We believe the use of high pressure increases the speed of the polymerizing reaction and results in the formation of larger molecules, probably because of the increased density of the hydrocarbons undergoing reaction. It is not understood whether this effect is the result of more frequent molecular collision or whether the extremely high pressure produces a more active catalyst complex. It is believed that the true catalyst in reactions of this type is a complex organic-inorganic compound formed between the hydrocarbon and the active metal halide and it is possible that the composition of this true catalyst is considerably influenced by the extremely high pressure.

Although we have described our invention by means of specific examples thereof, we do not intend that it be limited except as defined in the following claims.

We claim:

1. In the process of polymerizing hydrocarbons containing isobutylene into resins in the presence of a catalyst, the improvements which comprise subjecting the hydrocarbons to a pressure above 5,000 pounds per square inch, contacting the said hydrocarbons while under said pressure and at a temperature between about room temperature and 100° C., with a boron fluoride catalyst to form high molecular weight resins, reducing the pressure and thereafter separating the said resins and the reaction mixture.

2. The process of claim 1 wherein the pressure employed is between about 10,000 pounds per square inch and about 100,000 pounds per square inch.

3. In the process of converting liquid isobutylene into high molecular weight polymer resins, the improvements which comprise polymerizing the isobutylene in the presence of a boron fluoride catalyst while under a pressure between about 5,000 pounds per square inch and about 100,000 pounds per square inch and a temperature between about room temperature and 100° C., reducing the pressure on the reaction mixture and thereafter separating the said polymer resins from any unpolymerized hydrocarbon gases and excess boron fluoride.

4. The process of claim 3 wherein the liquid isobutylene is present as part of a mixture of hydrocarbons.

5. The process of claim 3 wherein the liquid isobutylene is present as part of a light absorption naphtha.

6. The process of claim 3 wherein the temperature is approximately room temperature.

7. The process of polymerizing isobutylene which comprises subjecting the isobutylene to a pressure of about 20,000 pounds per square inch, contacting the said isobutylene, while under said pressure, with borontrifluoride, while maintaining the reaction at about room temperature thereby forming high molecular weight polymer resins, thereafter reducing the pressure and recovering the said polymer resins.

WARD E. KUENTZEL.
WILLIAM L. WEBB.